(12) United States Patent
Amerio

(10) Patent No.: US 10,837,083 B2
(45) Date of Patent: Nov. 17, 2020

(54) METHOD FOR THE TREATMENT OF ALUMINIUM SLAGS TREATMENT AND ASSOCIATED PLANT

(71) Applicant: SAEG TECH SA, Lugano (CH)

(72) Inventor: Sasha Amerio, Almese (IT)

(73) Assignee: HEXPERIENCE TECHNOLOGIES S.R.L., Turin (IT)

(*) Notice: Subject to any disclaimer, the term of this patent is extended or adjusted under 35 U.S.C. 154(b) by 940 days.

(21) Appl. No.: 14/888,526

(22) PCT Filed: May 20, 2014

(86) PCT No.: PCT/IB2014/000789
§ 371 (c)(1),
(2) Date: Nov. 2, 2015

(87) PCT Pub. No.: WO2014/188258
PCT Pub. Date: Nov. 27, 2014

(65) Prior Publication Data
US 2016/0108495 A1    Apr. 21, 2016

(30) Foreign Application Priority Data
May 23, 2013    (IT) .............................. RM2013A0301

(51) Int. Cl.
*C22B 15/00*    (2006.01)
*C22B 19/00*    (2006.01)
(Continued)

(52) U.S. Cl.
CPC ............ *C22B 21/0023* (2013.01); *C01F 7/74* (2013.01); *C01F 7/746* (2013.01); *C22B 3/02* (2013.01);
(Continued)

(58) Field of Classification Search
None
See application file for complete search history.

(56) References Cited

U.S. PATENT DOCUMENTS 1,962,498 A    6/1934    Frost
3,393,975 A    7/1968    Mitchell et al.
(Continued)

FOREIGN PATENT DOCUMENTS

CH    699440    3/2010

OTHER PUBLICATIONS

Tsakiridis, "Aluminum salt slag characterization and utilization—A review," Journal of Hazardous Materials 217-218, pp. 1-10 (Year: 2012).*

(Continued)

*Primary Examiner* — Colin W. Slifka
(74) *Attorney, Agent, or Firm* — Nixon & Vanderhye

(57) ABSTRACT

Method for the secondary fusion aluminum slags treatment to obtain finished goods for agricultural, domestic and industrial use includes treating aluminous material with concentrated sulfuric acid to obtain aluminum sulfate, wherein the aluminous material comes from slags fed in lots of finite-dimension in a treatment plant of aluminum slags and includes aluminum oxides present in at least 30% by weight, the method includes: a) a first step of separating the metals present in the slags, by known methodologies, to obtain powders of metals as Fe, Cu, Zn, Ni and to obtain an aluminous component in the form of aluminum grains; b) a subsequent step of treating the aluminous component, with sulfuric acid to obtain aluminum sulfate in solution and/or in form of crystals; c) a subsequent step of obtaining a solid residual portion, derived from step b), apt to be used as a refractory material in applications with thermal character.

9 Claims, 1 Drawing Sheet

US 10,837,083 B2
Page 2

(51) Int. Cl.
*C22B 21/00* (2006.01)
*C22B 3/02* (2006.01)
*C22B 3/08* (2006.01)
*C22B 3/22* (2006.01)
*C22B 61/00* (2006.01)
*C01F 7/74* (2006.01)
*C22B 7/04* (2006.01)
*C25B 1/26* (2006.01)

(52) U.S. Cl.
CPC .................. *C22B 3/08* (2013.01); *C22B 3/22* (2013.01); *C22B 7/04* (2013.01); *C22B 15/00* (2013.01); *C22B 19/00* (2013.01); *C22B 61/00* (2013.01); *C25B 1/26* (2013.01); *Y02P 10/212* (2015.11)

(56) References Cited

U.S. PATENT DOCUMENTS 4,252,776 A    2/1981   Huckabay et al.
4,337,228 A    6/1982   Garrett, Jr.

OTHER PUBLICATIONS

Tsakiridis, "Aluminium salt slag characterization and utilization—A review," Journal of Hazardous Materials, vol. 217, Mar. 16, 2012, pp. 1-10.

\* cited by examiner

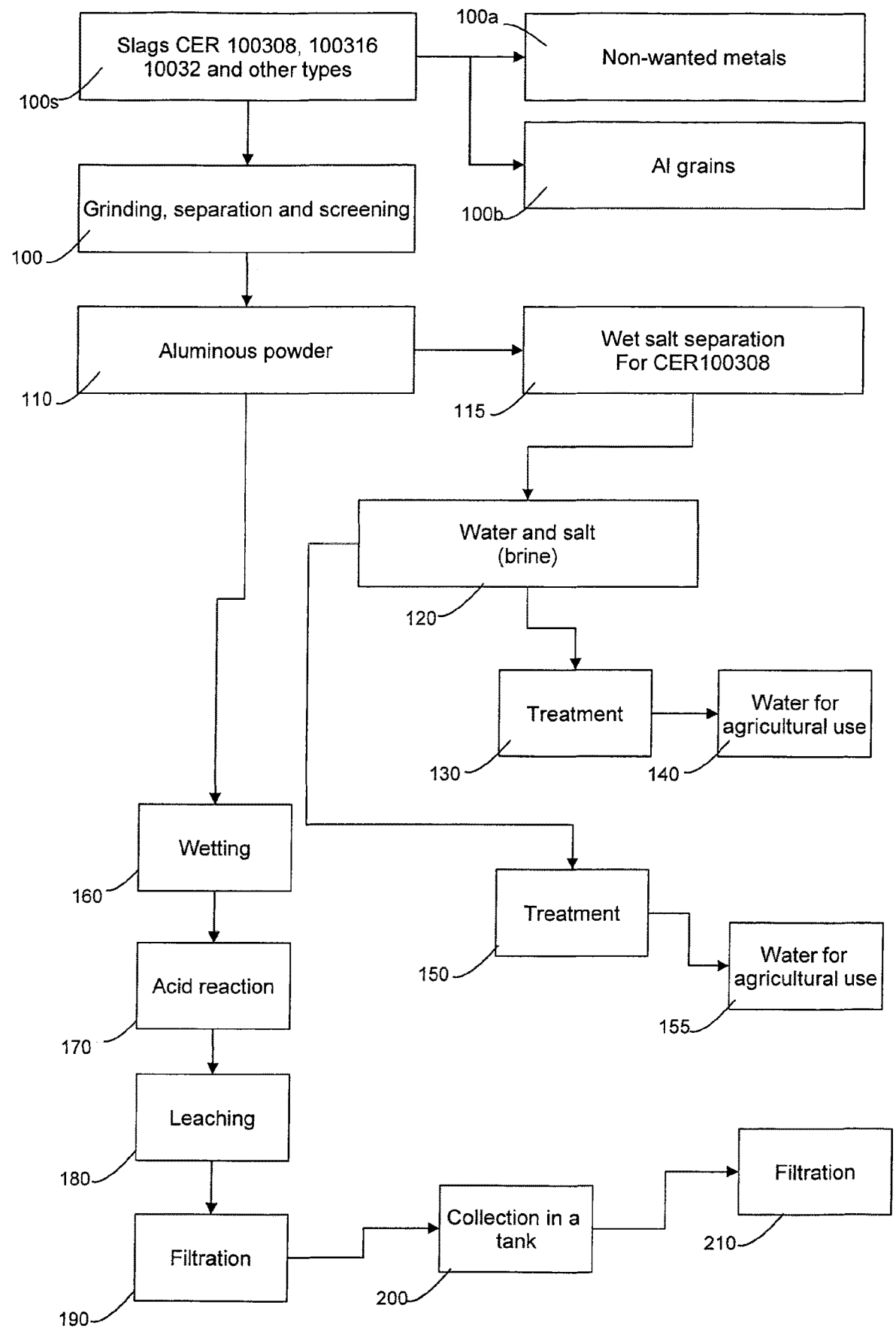

METHOD FOR THE TREATMENT OF ALUMINIUM SLAGS TREATMENT AND ASSOCIATED PLANT

FIELD OF THE INVENTION

The present invention refers to the field of metallurgy. In detail the present invention refers to a method for the treatments aluminum secondary smelting slags for obtaining finished goods intended for agricultural, animal, humane, domestic and industrial use.

BACKGROUND OF THE ART

Today, the industry of aluminum obtains its raw materials from two sources: a primary and a secondary. The raw material from which primary aluminum is originated (or primary fusion) is the bauxite mineral.

The secondary source is the recycled metal, deriving from products came to the end of their life cycle, for example old scraps, or the new fusion of scraps coming from the working of the industry of aluminum itself, or new scraps, with which the so called secondary aluminum, or aluminum of secondary fusion, is obtained.

Since the aluminum is one of the few metals that has almost unlimited technical reusability capabilities, in these last years, the industry of aluminum has obtained considerable progresses both in the development and in the enhancement of the processes, so as to increase the energetic and environmental efficiency in the various steps of the process, and increasing the amounts introduced in the recycle, so helping, further, the treatment of all the types of aluminum scraps.

In this sense, the present invention, that will be hereinafter described in detail, proposes a new method for the treatment of slags of aluminum, and in detail for the treatment of secondary aluminum slags. The method in object allows a total recuperation of materials, deriving from aluminous slags, transforming said materials into finished goods intended for the agricultural, animal, humane, domestic and industrial use. All of this, without leaving residuals intended for a possible disposal.

A method inherent to the treatment of aluminum slags, apparently similar to the one concerning the present industrial patent application, is described in the document CH699440. This last in detail refers to a process for obtaining aluminum sulfate material starting from an aluminous material containing aluminum oxide between 20% and 27% in weight. In that cited document, the process for obtaining the aluminum sulfate, involves the treatment of the aluminous material with sulfuric acid with a concentration of 95% in weight and the thermal treatment of the reaction mass so obtained. More in detail, the process described in document CH699440 is characterized in that the aluminous material, before being treated with sulfuric acid, is got wet, in that the sulfating reaction is performed at a temperature comprised between 320° C. and 350° C. and in that the sulfated product is then washed with water with a ratio from 2 to 4 parts in Weight of water volume per part in weight of sulfated product and at a temperature comprised between 80° C. and 90° C., up to the moment when the pH value lays in the interval comprised between 3.5 and 4.0; then the pulp is filtered, the filtrate is left evaporate and the aluminum sulfate is left become crystallized. As it will be disclosed throughout the following description, the method object of the present document differentiates, in a substantial manner from their cited documents, principally in that the treated aluminous material, and representing the slags of aluminum's secondary fusion, contains aluminum oxides not less than 30% in mass, from which a plurality of finished goods, intended for various uses, aluminum sulfate further than aluminum sulfate, can be obtained. Further also the production of aluminum sulfate in form of crystals differentiates from the one described in the document present in the art.

From document U.S. Pat. No. 4,252,776 is known a process for the treatment of aluminum slags a continuous flow that comprises a phase of lixiviation of the sulfated product through a continuous water flow, the use of high temperature water for the slags treatment and a preventive phase of grinding of slags with water. In the process, further, the gases deriving therefrom are burned for producing energy. The process described in the aforementioned document, is affected by some drawbacks. In detail, the continuous flow of slags does not allow to adapt the treatment according to the typology of the slags themselves, therefore making the process therein described of a perfectible efficiency.

Further, grinding the slags with water causes a waste, in view of the environmental safeguard or anyway of the limitation of the water volume used in the refining plant. Further, milling wet slags causes an higher complexity of the plant. The process described in the aforementioned document is further negatively characterized by a great consumption of energy; this is partially the reason for which that document teaches a combustion of process gases so that to contribute to the production of energy.

The scope of the present invention is therefore to describe a process of secondary fusion aluminum slags treatment that allows to solve the drawbacks above described.

DESCRIPTION OF THE INVENTION

The present invention refers to a new method for the f secondary fusion aluminum slags treatment, also known as "wastes of the thermal metallurgy of aluminum" (CER codes 100304*, 100308*, 100309*, 100315*, 100317*, 100319*, 100321*, 100323*, 100325*, 100327*, 100329*, 100302, 100305, 100316, 100318, 100320, 100322, 100324*, 100326, 100328, 100330, 100399). In detail, the present invention refers to a method that allows to recuperate the slags of secondary aluminum, by transforming said slags in finished goods intended for an agricultural, animal, humane, domestic and industrial use. The method object of the present industrial patent application, comprises performing a group of steps producing, each one, specific finished goods intended for the aforementioned uses. Said steps substantially consist, and in sequence, in the separation of the various metals that are present in the secondary aluminum slags, like iron, zinc, nickel, copper, and also those aluminum grains, so as to obtain metal powders directed to further uses; in the case of saline slags (CER code 100308*) in the treatment of the residual aluminous component with water so as to separate the aluminous component from its saline portion, typically containing chlorine salts and/or potassium salts, originating a solution that can be variously diluted and that represents, yet per se, a finished good targeted for example to an agricultural use, and that can be, alternatively, be concentrated by means of an electrolytic process, originating sodium hypochlorite concentrated solutions, or that can be vaporized by means of IR or UV specific lamps, so as to recuperate the salt in form of crystals; in the following treatment of the aluminous component, so desalted in case the origin is the one of saline slags, with a solution of sulfuric acid in water so as to obtain, by means of a sulfating process, aluminum sulfate in liquid form, that is in an aqueous solution, or in form of crystals, obtained by radiating the solution with IR or UV specific lamps; in the recuperation of the insoluble component, deriving by the previous sulfating phase, for obtaining of refractory material having a minimum resistance of 1500° C., in order to obtain a material suitable for applications in blast furnaces or as an insulator in conditions of high temperature or for further applications having a thermal character. The most innovative aspects of the method of treating of secondary fusion aluminum slags in the present document are represented substantially by the fact that the obtainment of products like the sodium hypochlorite in solution and intended for agricultural, industrial use are obtainable by industry slags (CER 100308*) with the aid of the electrolytic method, as well as the fact that the salts like the sodium chloride derive from the treatment of industry slags with water, by obtaining saline solution from which the salt is brought to the solid state by radiation with IR or UV specific lamps. Further innovations of the method in object are represented by the fact that the sulfating reaction, from which the aluminum sulfate solution can be obtained, is followed by the radiation of said solution with special IR and/or UV lamps so as to obtain aluminum sulfate in form of crystals.

Further, the obtainment of refractory material with method in object is also to be considered an innovation since the said refractory material is obtainable by aluminous industrial slags.

According to the present invention is therefore realized a method for the secondary fusion aluminum slags treatment for obtaining finished goods intended for agricultural, domestic and industrial use comprising the treatment of the aluminous material with concentrated sulfuric acid for obtaining aluminum sulfate, characterized in that the aluminous material, comes from slags fed in lots of finite-dimension in a plant of treatment of slags of aluminum and comprises aluminum oxides present for at least the 30% in weight, in that it comprises:

a) a first step of separation of the metals which are present in the, with known methodologies, for obtaining metals powders like Fe, Cu, Zn, Ni and for the obtainment of an aluminous component in form of aluminum grains;

b) a following step of treatment of the aluminous component, with sulfuric acid for obtaining of aluminum sulfate in solution and/or in form of crystals;

c) a following step of obtainment of a residual solid portion, obtained by the previous solid residual portion step of treatment of said aluminous component, apt to be used as refractory material in applications with thermal character.

Advantageously, said method is characterized in that it comprises in case of use of saline slags CER100308, before said step of treatment of their aluminous component:

d) a first step of de-salting of the residual aluminous portion with water, said first step being followed by a following filtration of the residual slags;

e) a second following step of treatment of the brine obtained according to said step of treatment of the aluminous component with further additions of water, said additions of water causing the formation of saline solutions with various concentrations intended for an agricultural use, and the optional electrolytic treatment of said saline solutions for forming solutions of sodium hypochlorite.

Advantageously, said method is characterized in that the solutions of brine obtained in said step of obtainment of a solid residual portion are vaporized by radiation with UV and/or IR lamps, said radiation causing the vaporization of the solvent and the precipitation of the salt in form of crystals.

Advantageously, said method is characterized in that the aluminum sulfate obtained in said step of treatment of the aluminous component in form of crystals, takes place through a radiation with IR and/or UV lamps, said radiation causing the vaporization of the solvent and the precipitation of crystals of $Al2(SO4)3$.

Advantageously, said method is characterized in that the treatment of the aluminous material, in case of use of de-salted saline slags CER 100308* obtained according to said step of treatment of the aluminous component, is got wet before being treated with the sulfuric acid, in that the reaction with this last happens at a temperature comprised between 100° C. and 400° C. for an interval of times comprised between 2 and 3 hours.

Advantageously said method is characterized in that it comprises a step of leaching of said sulfated product by means of water.

In detail, said water is at ambient temperature.

Alternatively, said process of leaching takes place by using a solid/liquid ratio of 1:3 at a temperature comprised between 80° C. and 90° C.

Advantageously, said method is characterized in that the refractory material obtained by said step of treatment of brine obtained according to said step of treatment of the aluminous component, presents a minimum thermal resistance of 1500° C.

Advantageously, said method is characterized in that it comprises a treatment of said aluminous material by means of dry grinding.

Advantageously, said method is characterized in that it comprises a step of aspiration and following recondensation of gases produced during any of the steps disclosed in the preceding claims; said following recondensation taking place with water used as processing water of said aluminous material.

Advantageously, said method is characterized in that it comprises a step of spilling of said solutions of brine on a bed and a following step of charging of said solutions on a carrying roller of cooling and/or solidification.

Advantageously, said carrying roller is configured for allowing said vaporization by means of radiation with UV and/or IR lamps; said method comprising a step of superposition of said lamps to said carrying roller.

According to the present invention is further realized a plant for the treatment of aluminum slags, comprising means for executing the above described method.

BRIEF DESCRIPTION OF DRAWINGS

Further features and advantages of the invention will appear more from the detailed description of some preferred but not exclusive embodiments of a method for the secondary fusion aluminum slags treatment for obtaining finished goods intended for an agricultural, animal, humane, domestic and industrial use according to the present invention.

Said description will be hereinafter exposed with reference to the annexed drawings, provided only for indicative purpose and, therefore, not being limitative, wherein:

FIG. 1 is a block scheme that resumes the path of transformation of the secondary fusion aluminum slags presenting, at the beginning, a percentage of aluminum oxides comprised between 30% and 70% according to the present invention. The scheme underlines the milling phase in fine powder, the screening and separation producing the aluminum grains and other metals; the following treatment "in wet form" of the residual powder with water producing the solution for agricultural, industrial use (in case of use of saline slags CER 100308); and the following treatment of aluminum oxides for obtaining the aluminum sulfate and the refractory material.

DETAILED DESCRIPTION OF THE INVENTION

The present invention concerns a method for the recuperation and complete reuse of aluminum slags, and in detail concerns the working of aluminum slags of the secondary fusion and in detail the working of slags with a mass percentage of aluminum oxides not less than 30%. Some types of the treated slags can, further, contain salts of Cl or of K up to 55% in weight, further than containing other residuals from various metals.

More in detail, the method in discussion involves the execution of various steps of process that allow to recuperate finished goods for various uses. In detail said finished goods, deriving from the transformation of the aluminum slags from secondary fusion, are intended for an agricultural, animal, humane, domestic industrial use.

Further more in detail, the method in object, allows for obtaining, as finished goods, powders of powders various metals, salts like sodium hypochlorite in aqueous solution, aluminum sulfate, and refractory materials apt to with thermal character.

With reference to FIG. 1, the method for treating the secondary aluminum slags comprises the following steps: a first phase or step of separation in the slags (block 100s), performed with methodologies known in the art, of the metal different from aluminum, for obtaining powders of elements like, for example, iron, zinc, nickel and copper. Said slags are fed to the plant in a discontinuous way, and more in detail in lots of finite-dimension, that can vary from case to case. According to the characteristics and the sizes of the lot, the dimensioning of the plant and of the process are adapted accordingly.

In detail, the powders are subjected to briqueting for being further reused in the founding (block 100). Said process is performed in dry, without allowing the slags enter in contact with water during the grinding phase. The first phase or step of separation allows, also through a process of screening, to separate the non-wanted metals (block 100a) from an Aluminum grain (block 100b), whose grains assume the form of a fine powder with grains having a size comparable to the one of the talc. More in detail, the separation of non-wanted metals, and in detail of Iron, takes place with the aid of magnetic means.

The aluminous powder so obtained (block 110) is therefore subjected to a following phase or step of de-salting of the residual aluminous portion with water (in case of saline slags CER 100308*), wherein the treatment with water and the following filtration of the slags, allows for separating salts from the aluminous part (stage 115), obtaining a combination of water and salts in saturate solution (brine) (stage 120).

Said brine is further treated according to the product that is wanted to obtain. In a first alternative, (block 130), the brine obtained is treated with further additions of water. These dilutions allow for obtaining aqueous saline solutions with various concentration suitable for their use in the agricultural sector (block 140). Alternatively, the brine can be subjected to a process or phase of concentration (block 150), preferably by means an electrolytic process, so as to form sodium hypochlorite at various concentrations (block 155). The solutions of sodium hypochlorite so obtained can be destined to animal and/or humane use or they can be used as disinfectant of domestic use, like, as a non-limiting example, the bleach.

The method object of the present invention further involves that in this phase, the salt dissolved in water can also be brought in form of crystals, by radiating the saline solution, in which said salt is contained in ionic form, preferably by means of the helping of specific IR and/or UV lamps. Said radiation causes in fact the vaporization of the solvent and the precipitation of the salt in form of crystals. The treatment of the aluminous component, de-salted when originate from the saline slags CER 100308*, normally named "insoluble" with an acid reagent that in the specific case comprises sulfuric acid (block 170). This phase of the method provides for that before reacting with the sulfuric acid, the aluminous material is got wet (block 160). The following treatment with the acid reagent, takes place for an interval of time comprised between 2 and 3 hours and preferably of 2.5 hours, in a exothermic reaction that takes place at a temperature comprised between 100° C. and 400° C., preferably between 120° C. and 200° C. At the end of the chemical reaction, a further predetermined amount of water is added, to the aim of diluting the product in an optimal way. The sulfated product so obtained, according to an embodiment of the invention is therefore leached with water (block 180), by using a solid/liquid ratio of 1:3, at a temperature comprised between 80° C. and 90° C. The leaching, that lasts preferably and in a non limiting way for a time interval comprised between 20' and 30', takes place in a non-continuous flow, that allows for obtaining an higher processing efficiency. The leaching reaction originates a pulp that is later filtered (block 190). More in detail, the water used for leaching the sulfated product is at ambient temperature, while the filtering phase takes place by means of a press filter whose dimensions are calculated according to size of the mixer, with a further washing of the slags collected in the filter; said slags will become the solid residual.

The so obtained liquid filtrate is first collected in a tank and then concentrated (block 200) so as to form aqueous solutions of aluminum sulfate containing aluminum sulfate from 8% to 10% in weight. Said aqueous solutions are left gush over for a predefined interval of time and then are aspired from the gushing tank and further subjected to a process of filtration that advantageously allows to eliminate the fine residuals. The solutions of aluminum sulfate obtainable in this phase are, further or in alternative, subjected to radiation (block 210) with IR or UV specific lamps, so as to facilitate the vaporization of the solvent and to obtain the aluminum sulfate in form of crystals. More in detail, in the phase of radiation, the aluminum sulfate is left slide on a bed and then loaded on a roller, on whose structures a is installed cover provided with said IR or UV lamps.

As already previously mentioned, there is a possible obtainment of a residual solid portion, obtained following the previous sulfating phase, apt to constitute a refractory material to be used in thermal applications wherein a minimum thermal resistance of 1500° C. is required.

In the above described process, the gases that are produced are aspirated by vacuum means and newly condensed with water, that is then at least partially recycled in the working process that is described above.

With the method for the treatments of aluminum slags so described, all the components that are present in the slags are transformed in typologies of product and are fully recuperated for a new reuse, avoiding the production of residuals addressed to an eventual disposal.

Advantageously, further, in the method described in the present invention is further possible to treat with high efficiency also the waste material arriving in lots, that so can be determined according to the size of the plant.

The water saving in the first phase of grinding, allows for optimizing the process with respect to the known art, contributing to a simplification of the plant.

The mixer is advantageously more precisely designable, thanks to the particular discontinuous functioning of the process. Unlike what happens in the traditional processes with continuous flow, wherein the slags are not subdivided in lots, the oversizing of the plant can be significantly reduced, with the advantage of the optimization of the build-up and carrying costs.

Advantageously, the process described in the present invention is efficient, since the gases used with water condensation, to the end of a new admission in the working process, contribute to the reduction of the overall amount of hydraulic need for the slags treatment.

It is finally clear that to the process heretofore described can be applied additions, modifications or variants obvious for the skilled person without departing from the scope of protection provided by the annexed claims.

The invention claimed is:

1. Method of secondary fusion aluminum slags treatment for obtaining finished goods intended for agricultural, domestic, and industrial use comprising the treatment of an aluminous material with concentrated sulfuric acid for obtaining aluminum sulfate, wherein the aluminous material comes from saline slags CER100308 fed in lots of finite-dimension in a plant of aluminum slags treatment and comprises aluminum oxides present for at least 30% in weight, the method comprising:
   a) a first step of separation of the metals present in the saline slags CER100308 having at least 30% in weight aluminum oxide, with known methodologies, for obtaining powders of metals Fe, Cu, Zn, and/or Ni and for obtaining an aluminous component in form of aluminum grains;
   b) a following step of de-salting of the aluminous component with additions of water, said de-salting step being followed by a filtration of the aluminous component;
   c) a following step of treatment of brine obtained according to said de-salting, wherein the additions of water in the desalting step caused the formation of saline solutions at various concentrations destned to agricultural use, and the electrolytic treatment of said saline solutions for forming solutions of sodium hypochlorite;
   d) a following step of treatment of the aluminous component with sulfuric acid for obtaining aluminum sulfate,
   wherein the aluminous component is wetted before being treated with the sulfuric acid,
   wherein the reaction takes place at a temperature comprised between 100° C. and 400° C. for an interval of time comprised between 2 and 3 hours,
   wherein the aluminum sulfate is obtained in form of crystals by means of radiation with lamps IR and/or lamps UV, said radiation causing the vaporization of the solvent and the precipitation of the crystals of $Al_2(SO_4)_3$,
   e) a following step of obtaining a solid residual portion, obtained from the preceding step of treatment of said aluminous component, wherein the solid residual portion is suitable for use as refractory material in applications with thermal character.

2. Method for the secondary fusion aluminum slags treatment for obtaining finished goods intended for agricultural, domestic and industrial use according to claim 1, further comprising a step of leaching of the aluminum sulfate obtained at step d) by means of water.

3. Method for the secondary fusion aluminum slags treatment for obtaining finished goods intended for agricultural, domestic and industrial use according to claim 2, wherein said water is at ambient temperature.

4. Method for the secondary fusion aluminum slags treatment for obtaining finished goods intended for agricultural, domestic and industrial use according to claim 3, further comprising a step of spilling of said solutions of brine on a bed and a following step of charging of said solutions on a carrying roller of cooling and/or solidification.

5. Method for the treatment of secondary fusion aluminum slags for obtaining finished goods intended for agricultural, domestic and industrial use according to claim 4, wherein said carrying roller is configured for allowing vaporization of brine solutions by radiation with UV and/or IR lamps; said method comprising a step of superposition of said lamps to said carrying roller.

6. Method for the secondary fusion aluminum slags treatment for obtaining finished goods intended for agricultural, domestic and industrial use according to claim 2, wherein said process of leaching takes place by using a solid/liquid ratio of 1:3 at a temperature comprised between 80° C. and 90° C.

7. Method for the secondary fusion aluminum slags treatment for obtaining finished goods intended for agricultural, domestic and industrial use according to claim 1, further comprising a treatment of the saline slags CER100308 in the separation step by means of dry grinding.

8. Method for the secondary fusion aluminum slags treatment for obtaining finished goods intended for agricultural, domestic and industrial use according to claim 1, further comprising a step of aspiration and following recondensation of gases produced during any of the steps; said following recondensation taking place with water used as processing water of said aluminous material.

9. Method for the secondary fusion aluminum slags treatment for obtaining finished goods intended for agricultural, domestic, and industrial use comprising the treatment of the aluminous material with concentrated sulfuric acid for obtaining aluminum sulfate, wherein the aluminous material comes from saline slags CER100308 fed in lots of finite-dimension in a plant of aluminum slags treatment and comprises aluminum oxides present for at least 30% in weight, the method comprising:
   a) a first step of separation by means of dry grinding of the metals present in the saline slags CER100308 having at least 30% in weight aluminum oxide, with known methodologies, for obtaining powders of metals Fe, Cu, Zn, and/or Ni and for obtaining an aluminous component in form of aluminum grains;
   b) a following step of de-salting of the aluminous component with additions of water, said de-salting step being followed by a filtration of the aluminous component;
   c) a following step of treatment of brine obtained according to said de-salting, wherein the additions of water in the desalting step caused the formation of saline solutions at various concentrations destned to agricultural use, and the electrolytic treatment of said saline solutions for forming solutions of sodium hypochlorite;
d) a following step of treatment of the aluminous component with sulfuric acid for obtaining aluminum sulfate in solution and/or in form of crystals,
wherein the aluminous component is wetted before being treated with the sulfuric acid,
wherein the reaction takes place at a temperature comprised between 100° C. and 400° C. for an interval of time comprised between 2 and 3 hours,
wherein the aluminum sulfate is obtained in form of crystals by means of radiation with lamps IR and/or lamps UV, said radiation causing the vaporization of the solvent and the precipitation of the crystals of $Al_2(SO_4)_3$;
e) a following step of obtaining a solid residual portion, obtained from the preceding step of treatment of said aluminous component, wherein the solid residual portion is suitable for use as refractory material in applications with thermal character;
wherein the method is carried out in a non-continuous manner on lots of saline slags CER100308.

\* \* \* \* \*